Jan. 5, 1960 J. M. O'BRIEN 2,920,196
BISTABLE DEVICE
Filed Oct. 9, 1957
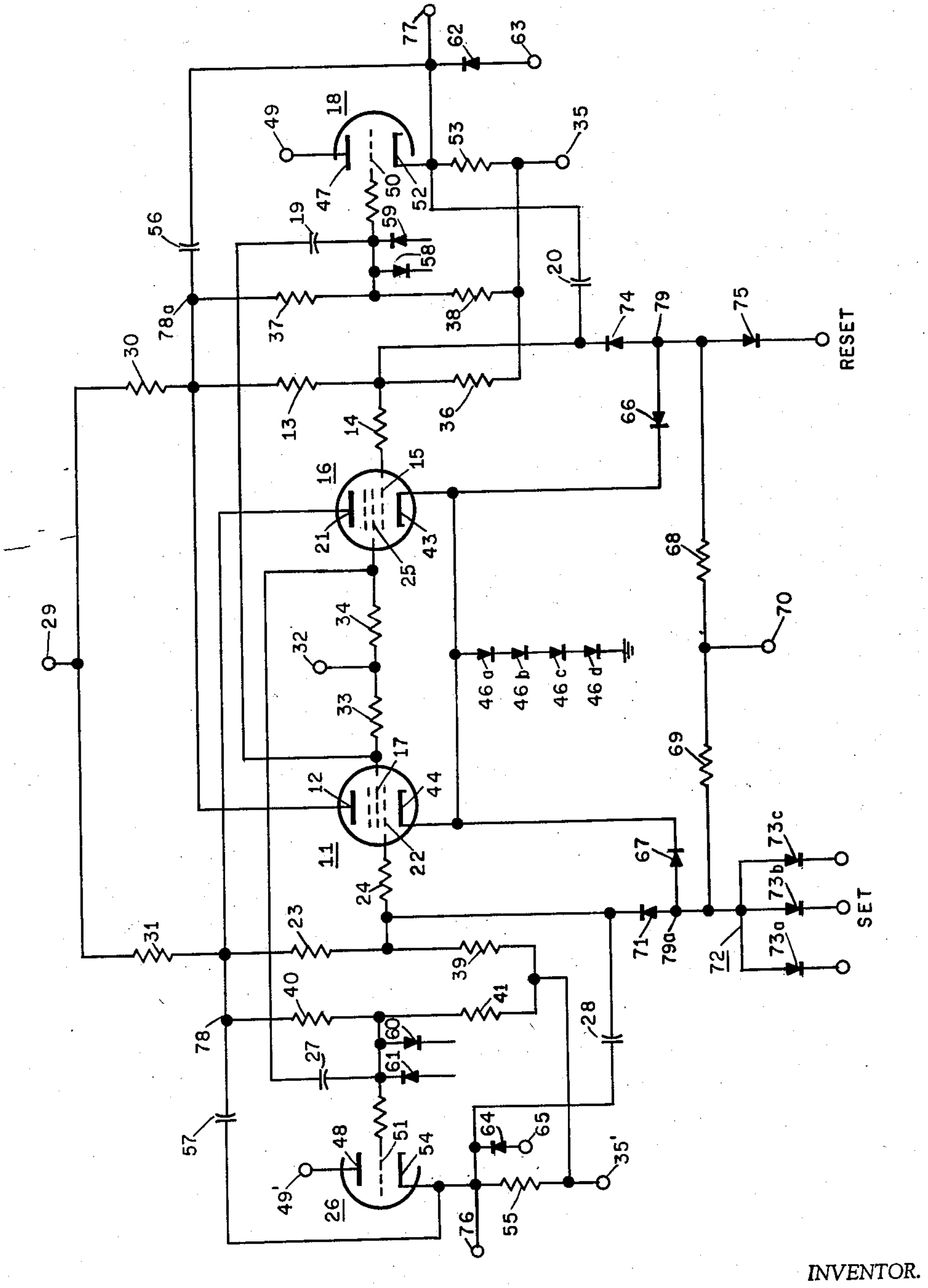
INVENTOR.
John M. O'Brien
BY F. D. Sullivan
ATTORNEY 2,920,196

BISTABLE DEVICE

John M. O'Brien, Arlington, Mass., assignor, by mesne assignments, to Sylvania Electric Products Inc., Wilmington, Del., a corporation of Delaware Application October 9, 1957, Serial No. 689,227

4 Claims. (Cl. 250—27)

This invention is concerned with bistable electronic devices, and particularly with an improved flip-flop circuit useful in computers.

An electronic digital computer may use hundreds, or thousands, of flip-flop circuits in its arithmetic, memory, and other components to indicate by voltage levels the 0 and 1 of a binary mathematical system. These flip-flops operate at micro-second repetition rates with the leading and trailing edges of their output signals measured in millimicroseconds. Such rapid rise and fall of voltage in these areas of transition from one level to another is extremely critical for proper coordination with trigger pulses, gates, etc. in the circuitry associated with the flip-flops.

Conventional flip-flops use two triodes, or pentodes, with a regenerative loop connecting the plate of each to the grid of the other. The plate to grid coupling takes the form of a resistive divider; and, because the input capacitance of the grid in combination with the divider produces an RC delay in the transition time and a curved instead of a sharp dividing line between output levels of the flip-flop, a compensating capacitor is connected across the coupling resistor. The introduction of this capacitor, however, while it offers some advantages, does not solve the problem entirely. As explained by Millman and Taub in a recently published (McGraw-Hill, 1956) definitive work, "Pulse and Digital Circuits," (pp. 150–156), there are additional capacitances, as the flip-flop tube goes from the cut off-to grid base-to grid clamp, which combine with coupling and load resistances to produce an RC delay in transmission time. Hitherto, the only way to compensate for these RC delays has been to cut down on resistor values and introduce clamping diodes throughout the circuit to limit voltage swing. This technique is expensive in current drain and power dissipation, and limits output signal voltage. Also, it increases the complexity and precision requirements of the circuitry.

The transition time so far referred to is that required for a flip-flop output voltage to rise from one level to another. This is called rise time, and determines the shape of the leading edge of the high level signal. Flip-flops hitherto available also have a drawback involving the time it takes, even when cathode follower coupling in the regenerative loop is employed to minimize the resistive component in the associated RC constant, for the output to fall from high to low voltage level. This is referred to as fall time, and determines the trailing edge of the high level voltage wave form. Millman and Taub (op. cit. pages 138–9) discuss the deficiencies of conventional circuitry in this respect.

The primary object of the present invention is to provide for computers and other applications an improved flip-flop circuit, and, specifically, one which will provide an appreciable output signal with a rise and fall transition time of the order of 100 millimicroseconds.

With these objectives in view, the invention is featured by a pentode flip-flop having its regenerative loop divided into direct coupling from plate to control grid and dynamic coupling from screen grid to control grid. Other objectives and applications of the invention will be apparent from the following description of a preferred embodiment and reference to the accompanying drawing, the single figure of which is a schematic diagram of a pentode flip-flop circuit.

In the circuit shown, pentode 11 has its anode or plate 12 directly coupled through resistors 13 and 14 to the control grid 15 of pentode 16, and its screen grid 17 dynamically coupled, through cathode follower 18 and capacitors 19 and 20, to grid 15. Similarly, the plate 21 of pentode 16 is coupled to control grid 22 of pentode 11, through resistors 23 and 24; and, its screen grid 25 is coupled to grid 22 through cathode follower 26 and capacitors 27 and 28.

Operating potentials are applied to pentodes 11 and 16 as follows: plate voltages from terminal 29, through resistors 30 and 31; screen grid bias from terminal 32, through resistors 33 and 34; bias for control grid 15 from a resistive divider between terminals 29 and 35, comprising resistor 30 in series with a parallel series arrangement of resistors 13, 36, 37 and 38; bias for control grid 22 from a similar resistive divider between terminals 29 and 35' and comprising resistor 31 in series with a parallel series arrangement of resistors 23, 39, 40 and 41; and bias for cathodes 43 and 44 from terminal 45 (ground) through stabistors 46 *a–d*.

The cathode followers 18 and 26 derive their operating potentials in this manner: plates 47 and 48 from terminal 49 and 49' respectively; control grid 50 from the same resistive divider as control grid 15, and control grid 51 from the same divider as control grid 22; cathode 52 from terminal 35, through resistor 53; and, cathode 54 from terminal 35' through resistor 55.

Capacitor 56 couples the plate 12 of pentode 11 to the output of cathode follower 18; and capacitor 57 serves a similar function between the plate 21 of pentode 16 and the output of cathode follower 26.

Diodes 58 and 59 limit the voltage swing of grid 50; and diodes 60 and 61 serve a similar function for grid 51. Similarly, diode 62 clamps cathode 52 to a reference potential applied at terminal 63; diode 64 clamps cathode 54 to the voltage at terminal 65; and diodes 66 and 67 clamp points 79 and **79*a* to cathodes 43 and 44** respectively to limit grid current during pulsing interval.

Diode 71 acts as a clamp for control grid 22, and also serves as an "OR" gate coupling the "Set" input from "AND" gate 72 (comprising parallel diodes 73 *a–c*) to the grid 22. Diode 74 acts as a clamp for control grid 15 and constitutes an "OR" gate coupling it to the "Reset" input through diode 75.

Output is taken from terminals 76 and 77.

The flip-flop disclosed has provided, with a capacitive loading of 100 micro-microfarads, a 25 volt output at a 1.5 megacycle repetition rate with rise and fall transition times of 100 millimicroseconds in a circuit having the following value and commercial identity of components:

| | |
|---|---|
| Pentodes **11** and **15** | 404A |
| Resistors **13**, **23**, **37** and **40** | 150K |
| Resistor **14** | 47Ω |
| Cathode followers **18** and **26** | ½ 5687 |
| Capacitors **19** and **27** | 68 μμf. |
| Capacitors **20** and **28** | 20 μμf. |
| Potential at terminals **29** and **32** | +150 v. |
| Resistors **30** and **31** | 22K |
| Resistors **33** and **34** | 8.2K |
| Potential at terminals **35** and **35'** | −150 v. |
| Resistors **36**, **38**, **39** and **41** | 390K |
| Stabistors **46** *a–d* | SG22 |
| Potential at terminals **49** and **49'** | +75 v. |
| Capacitors **56** and **57** | 180 μμf. |
| Diodes **58–62**, **64**, **66–7**, **71–5** | Sylvania D-1045 |
| Potential at terminals **63** and **65** | −4.5 v. |
| Resistors **68** and **69** | 7.5K |
| Potential at terminal **70** | +20 v. |

When pentode 11 conducts pentode 16 is cut-off, and vice versa. Hence there is always conduction through one, but only one, of the pentodes. If pentode 11 conducts and pentode 16 is cut off, a positive output is available at terminal 76 and a negative output appears at terminal 77. Similarly, when pentode 16 conducts and 11 is cut off, terminal 76 swings negative and terminal 77 goes positive.

The pentode which is conducting will continue in that condition, and consequently the circuit output will be undisturbed until a positive pulse (approximately a 4 volt swing from −3 v. to +1 v.) is applied to the control grid of the other pentode, whereupon the second tube conducts and the first cuts off. Thus the circuit can be used to indicate and/or store binary intelligence by appropriate control of positive pulses to the "Set" and "Reset" input terminals. A more detailed explanation of the circuit operation follows.

The circuit illustrated and described has been employed as a so-called "static" flip-flop in an electronic computing device. This type of flip-flop is also termed a "flopover," "bistable," or "binary" circuit. Its function is to have the outputs at 76 and 77 vary between two levels (e.g. −4.5 v. and +20) in response to the pulses applied at the "Set" and "Reset" inputs.

With an initial assumption that pentode 16 is conducting, it draws plate current from terminal 29, through resistor 31. Its cathode 43 is held at a carefully regulated 3 volts above ground by a series arrangement of four .75 volt stabistor diodes; and its control grid 15 is biased considerably positive by connection to the resistive voltage divider between terminals 29 and 35.

With pentode 16 conducting, as described, the potential at point 78 is a few volts above ground. This cuts off cathode follower 26 because its cathode 54 is clamped at −4.5 by diode 64 and its grid 51 is biased at a more negative potential, since it is connected to the junction of resistors 40 and 41 which comprise a voltage divider between the positive 3 volts at point 78 and the negative 150 volts at terminal 35. Thus, the output signal at terminal 76 is the −4.5 to which the cathode of follower 54 is clamped by diode 64.

The control grid 22 of pentode 11, which is connected to a parallel impedance in the same network to which grid 51 of cathode follower 26 is connected, will also be negatively biased. The cathode 44 of this pentode 11 is biased at +3 volts, and consequently, the tube is cut off. Thus, its plate potential applied across the voltage divider comprising resistors 37 and 38 develops a positive bias on the grid 50 of cathode follower 18 which, consequently, conducts and produces across cathode resistor 53, a positive signal (approximately +20 volts) at circuit output 77.

The circuit will remain in this condition, with a negative output at 76 and a positive output at 77, until a positive pulse of sufficient amplitude (approximately 4 volts) is applied to the control grid 22 of the non-conducting pentode 11.

The positive pulse required is applied in accordance with conventional computer practice through the "Set" input. In the circuit shown this input takes the form of a 3 diode (73 *a–c*) "AND" gate. Each of the diodes is connected to the secondary winding of a pulse transformer, biased at approximately a negative 3 volts. Normally, current flows from the +20 volts at terminal 70, through resistor 69 and diodes 73 *a–c* to the negative bias on these secondaries. A positive pulse to any one or combination of the gate diodes will have no effect on the circuit because the remaining diode (or diodes) will clamp point 79 to −3 volts. When, however, positive pulses are applied to all of the diodes, the positive potential at terminal 70, is applied through resistor 69 and diode 71, to grid 22 to render pentode 11 conductive.

When pentode 11 starts to conduct, plate current is drawn from terminal 29, through resistor 30. This lowers the potential at point 78*a* to a few volts above the cathode potential of pentode 11 and causes control grids 15 and 50 of devices 16 and 18, respectively, to swing negative with respect to their cathodes and cut off their respective tube sections. With cathode follower 18 thus cutting off, the potential at terminal 77 follows the drop in control grid potential and falls to the −4.5 to which it is clamped.

The "fall time," or speed of transition from +20 to −4.5 volts at terminal 77 would normally follow a curve determined by the RC constant of resistor 53 and the capacitance of the load, as well as by the delay inherent in the response of control grid 50 due to the combination of its series resistor and associated capacitance. Such limitation is overcome, in this embodiment of the present invention, by coupling (through capacitator 56) plate 12 of the newly conducting pentode 11, across cathode follower 18, to terminal 77. Thus an immediate voltage drop is provided, through capacitor 56, at terminal 77, which drop is later sustained by cut off of cathode follower 18.

Responsiveness of cathode follower 18, itself, to the conduction commenced in pentode 11 is speeded by *a* novel dynamic coupling, through capacitor 19, from the screen grid 17 of pentode 11 to the control grid 50 of cathode follower 18. This causes the grid to respond instantaneously to the drop in screen potential, when the pentode commences to conduct, and cut off the cathode follower. This response is sustained by the direct coupling from plate 12 to control grid 50, following the RC constant of resistor 37 and the capacitance associated with grid 50.

The negative going output from cathode follower 18 is connected, via capacitor 20 to the control grid 15 of pentode 16 (which had hitherto been conducting) and cuts it off. The speed of this response is aided by the coupling, via capacitators 20 and 56, from plate 12 of pentode 11 to the control grid 15. The capacitor 56 which connects plate 12 to cathode 52 provides a pull down or discharge path for the cathode follower shunt capacitance. The immediate cut-off accomplished by this dynamic coupling is sustained by negative bias supplied to the grid by its connection to the junction of voltage divider resistors 37 and 38.

When pentode 16 is thus cut off, there is an instantaneous rise in its screen voltage dynamically conducted through capacitor 27, to control grid 51 of cathode follower 26, which is sustained by direct coupling of the rise in plate voltage conducted through resistor 40. The consequent rise in potential at control grid 51 causes cathode follower 26 to conduct, and raises the circuit output voltage signal at terminal 76. The "rise time" or transition from low to high voltage signal at terminal 76 is materially shortened, in accordance with the invention, by the dynamic coupling, through capacitator 27, from screen grid 25 of pentode 16 to control grid 51 of cathode follower 26.

The circuit remains in its newly established condition, with a positive output at terminal 76 and a negative output at terminal 77, until it is changed back to its original condition, with outputs reversed, by a positive pulse applied to the grid of non-conducting pentode 16 by means of the "Reset" input. The "Reset" pulse renders pentode 16 conductive, and sets up a chain of effects, similar, but reverse, to when a positive "Set" pulse was applied to grid 22 of pentode 11.

The circuit is made more quickly responsive to signal voltage changes by the use of clamping diodes 58 and 59 to limit the swing of control grid 50 of cathode follower 18 to twenty volts positive and negative, and diodes 60 and 61 to serve the same purpose for control grid 51 of cathode follower 26.

Diodes 62 and 64 clamp the outputs at terminals 77 and 76 and the cathodes of cathode followers 18 and 26 to a negative 4.5 volts.

Diodes 66 and 67 keep the potential at the "Set" and "Reset" gates respectively from going more than one volt positive with respect to cathodes 43 and 44.

The voltage drop from +20 volts across resistors 68 and 69 is clamped at points 79 and 80 by diodes 75 and 73 *a–c*, respectively, to the −3 volts bias on the secondary of the input transformers; and control grids 22 and 15 are also clamped through diodes 71 and 74, respectively, to the substantially 3 volts negative at points 79 and 80.

The preferred embodiment of the invention shown and described features a static flip-flop circuit, useful in electronic computers, and designed to provide a 25 volt output at a 1.5 megacycle repetition rate with a rise and fall transition time of 100 millimicroseconds for a load of 100 microfarads. The invention, however, is not limited to this specific embodiment or application and is to be given the scope of the appended claims.

What is claimed is:

1. A bistable electronic circuit which comprises first and second electron discharge devices each having at least cathode, control, screen and anode electrodes, means including a resistor connecting the anode of each to the control electrode of the other, means including a cathode follower having at least cathode and control electrodes connecting the screen electrode of each to the control electrode of the other, and separate capacitors respectively coupling: the control electrode of said cathode followers to the screen electrode of said each device; the cathode of said cathode followers to the anode of said each device; and, the cathode of said cathode followers to the control electrode of said other device.

2. A bistable circuit which comprises a pair of electron discharge devices each having at least a cathode, an anode, and control and screen electrodes, a resistor respective to each anode arranged to cross-connect the anode of each device to the control electrode of the other, a capacitance coupling respective to each anode arranged in parallel with said resistors to cross-connect the anode of each to the control electrode of the other, and a capacitative coupled cathode follower respective to each screen electrode arranged to cross-connect the screen electrode of each device to the control electrode of the other.

3. A flip-flop circuit which comprises first and second pentodes each having at least cathode, control grid, screen grid, and plate electrodes, common voltage stabilizing means common to both of said cathodes and connecting them to ground, means including a voltage divider in the plate circuit of each arranged to control the bias voltage at the control grid of the other, first and second cathode followers each having at least cathode and control grid electrodes, separate capacitors connecting the screen grid of said first pentode to the control grid of said first cathode follower, the cathode of said first cathode follower to the control grid of said second pentode, the screen grid of said second pentode to the control grid of said second cathode follower, and the cathode of said second cathode follower to the control grid of said first pentode, separate means each including at least one capacitor in shunt with a resistor connecting the plate of each of said pentodes to the control grid of the other, means for applying an input signal to the control grid of each of said pentodes, means arranged to derive an output signal at the cathode of each of said cathode followers, negative voltage clamping means connected to the cathode of each of said cathode followers, and negative and positive voltage clamping means connected to the control grids of each of said cathode followers.

4. A flip-flop circuit which comprises first and second pentodes each having at least cathode, control grid, screen grid, and plate electrodes, voltage stabilizing means common to both of said cathodes and connecting them to ground, means including a voltage divider in the plate circuit of each arranged to control the bias voltage at the control grid of the other, first and second cathode followers each having at least cathode and control grid electrodes, separate capacitors connecting the screen grid of said first pentode to the control grid of said first cathode follower, the cathode of said first cathode follower to the control grid of said second pentode, the screen grid of said second pentode to the control grid of said second cathode follower, and the cathode of said second cathode follower to the control grid of said first pentode, separate means each including at least one capacitor in shunt with a resistor connecting the plate of each of said pentodes to the control grid of the other, means for applying an input signal to the control grid of each of said pentodes, and means arranged to derive an output signal at the cathode of each of said cathode followers.

References Cited in the file of this patent

UNITED STATES PATENTS 2,545,924 Johnstone ---------------- Mar. 20, 1951

FOREIGN PATENTS 251,761 Switzerland ----------- Aug. 16, 1948
587,351 Great Britain ---------- Apr. 23, 1947